UNITED STATES PATENT OFFICE.

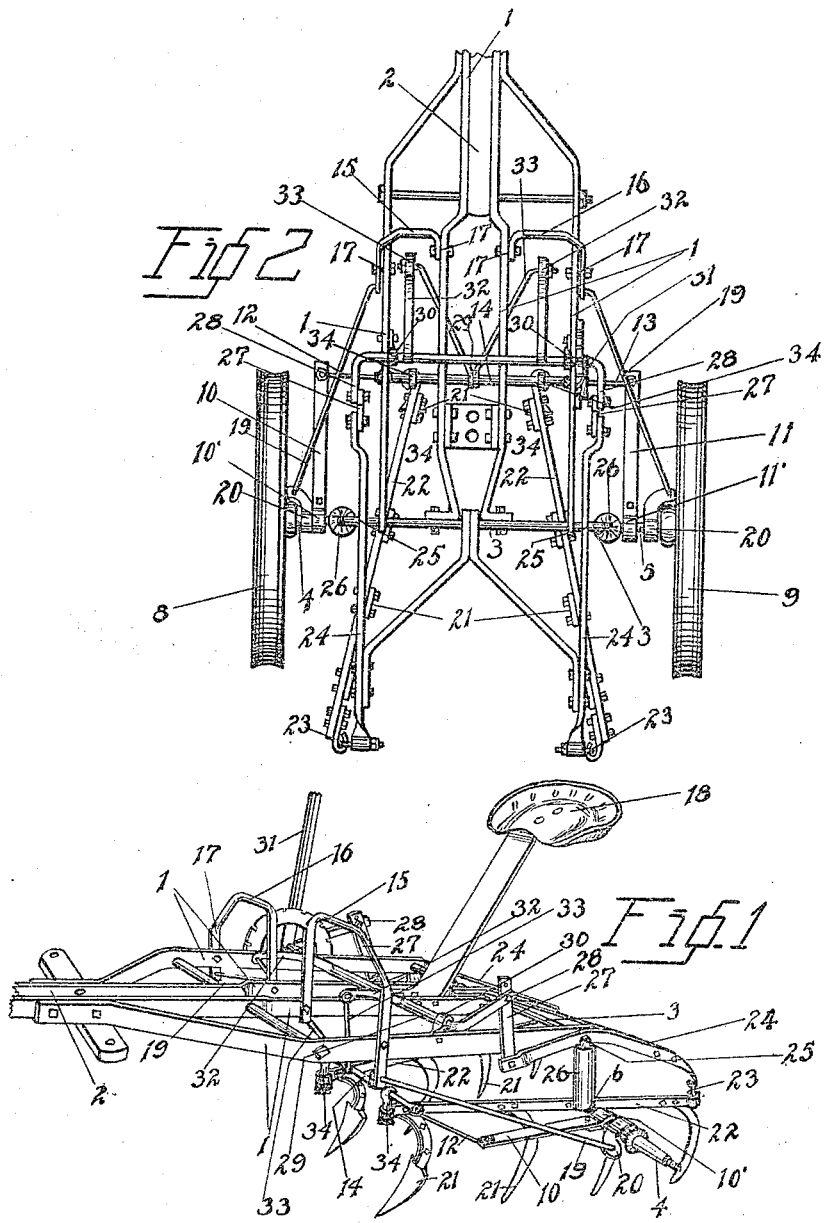

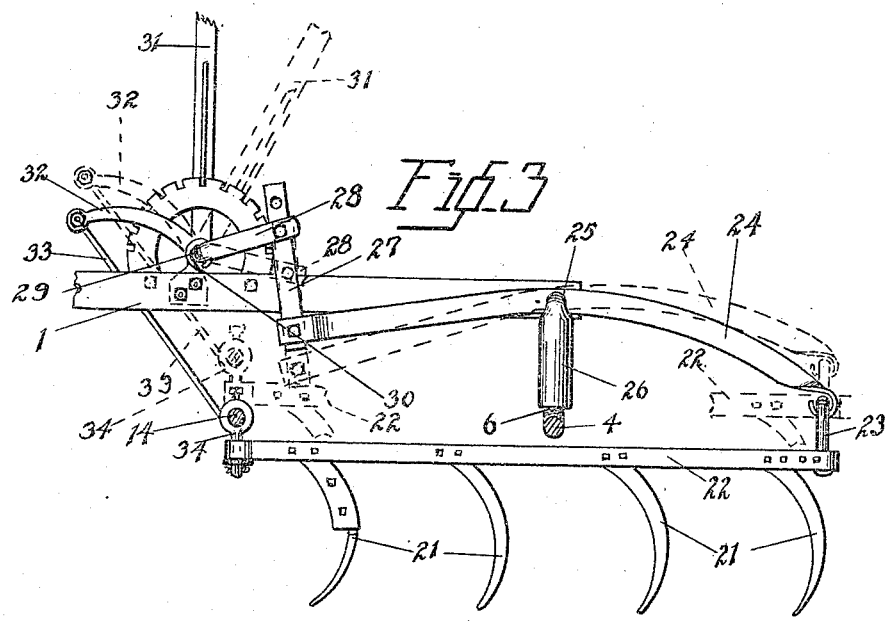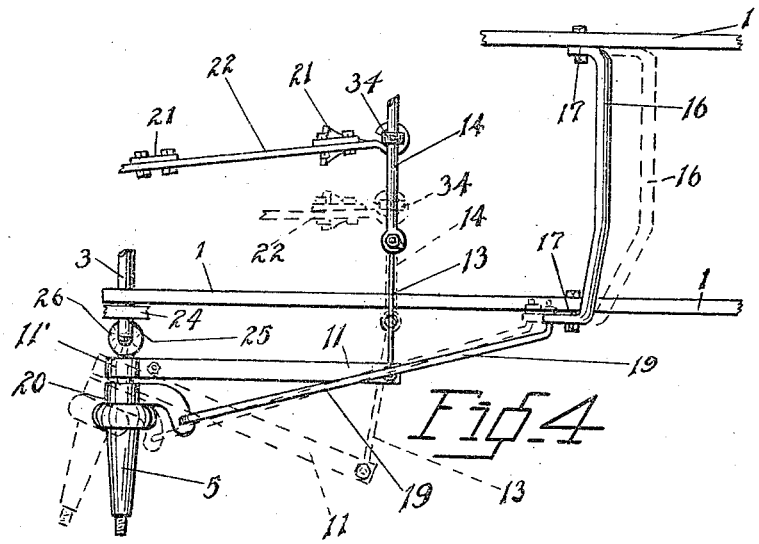

IRBY B. CASEY, OF KEISLING, WASHINGTON.

RIDING-CULTIVATOR.

1,294,769.  Specification of Letters Patent. Patented Feb. 18, 1919.

Application filed July 14, 1917. Serial No. 180,611.

*To all whom it may concern:*

Be it known that I, IRBY B. CASEY, a citizen of the United States, residing at Keisling, in the county of Spokane and State of Washington, have invented certain new and useful Improvements in Riding-Cultivators, of which the following is a specification.

The present invention relates to improvements in riding cultivators and similar implements, and is designed especially to provide an improvement in implements of this character whereby the cultivator may be guided, by the operator, to avoid destruction of vegetation and yet maintain a proper cultivation in irregular rows; and the invention also involves an improved and simplified mechanism for bodily lifting the cultivator frame and its shovels into inoperative position, and for adjustment of the cultivator shovels.

It frequently happens in farming, that rows of growing corn, potatoes, and other vegetation, present an irregular line along which the cultivating machine must travel, and be guided, in order to reach the highest state of cultivation, and to accomplish the guidance of the implement I utilize a pair of pivoted or swiveled wheels, operable in unison, and provide pedal operated devices by means of which the wheels may be turned to guide the implement along a sinuous course; and the invention further consists in devices, preferably manually operated, for bodily lifting the cultivator frame and its cultivating shovels from the ground, and for adjusting the height of the shovels.

In the accompanying drawings one complete example of the physical embodiment of the invention is illustrated showing the best mode so far devised for the practical application of the principles of the invention.

Figure 1 is a perspective view showing an implement embodying the novel features of the present invention.

Fig. 2 is a top plan view of the cultivator.

Fig. 3 is an enlarged, detail view showing the mechanism for adjusting the cultivator frame and its shovels.

Fig. 4 is a top plan view, enlarged, of one of the pedal devices and its connections to the stub shaft or pivoted axle section of one of the wheels.

The riding cultivator as illustrated has a main frame 1 comprising four longitudinally arranged parallel bars that converge at the front for attachment to the tongue 2, and at the rear the four bars are rigidly secured to the central or main axle 3 of the implement. At its ends this axle has a pair of extensions or stub axles 4 and 5, pivoted or swiveled at 6 and 7 respectively to turn in horizontal planes, and these stub axles are equipped with the usual traction wheels 8 and 9 to support the implement. The stub axles are connected by a yoke so that the axles and wheels may be moved in unison, and the yoke comprises a pair of forwardly extending side arms 10, 11 secured at 10' and 11' respectively to their axles and joined at their forward ends by the two links 12 and 13 to the transverse slide bar 14 which is supported by and movable in the frame 1 of the implement. The wheels 8 and 9 may be turned in unison through the instrumentality of this yoke connection by either of a pair of pedal levers 15 and 16 which are pivoted on the main frame at 17, 17, and easily accessible for the operator or driver who is sitting in the seat 18. Each pedal lever is connected to a stub axle by the arms 19 and the shackle 20, and inasmuch as the stub axles are adapted to move in unison through the above described yoke connection, it will be seen that when the driver desires to turn to the right he bears upon the lever 16, which action swings the stub axle and its wheel 9, to the right, as in dotted lines Fig. 4 and the other wheel will also be turned. When the implement is to be turned to the left, foot pressure on the pedal lever 15 will swing the axles and wheels in the desired direction, the wheels moving in unison as before.

In this manner the driver has full and effective control of the implement and may steer or guide the machine through a sinuous course to avoid destruction to the growing vegetation, and yet accomplish the most effective cultivation.

The shovels 21 of the cultivator, which are of suitable and approved type, are carried on the beams 22 which comprise the liftable and adjustable cultivator frame, and are located between the two wheels, converging slightly toward the front of the implement. At the rear these two beams are connected by vertically arranged pivoted links 23 to the arched levers 24 that have their fulcrums at 25 on the posts 26, rising vertically from the main axle 3 and located between the swivel joints of the axle and adjacent thereto. At their forward ends these levers 24 are connected by pivoted links 27 to the two crank arms 28 28 at the ends of the rock shaft 29 which is journaled in brackets 30 30 on the main frame 1 and movable through the instrumentality of the hand lever 31. This rock shaft has a pair of forwardly extending rock arms 32 32 located at the side of the longitudinal center of the implement and above the main frame, and from these rocker arms the converging bars 33, 33 extend downwardly and rearwardly being pivoted to the arms and to the transverse bar 14 of the yoke that connects the two stub axles and moves them in unison. The slide bar 14 is connected to the cultivator beams by the pair of coupling members 34, 34, and these parts complete the suspension devices for the cultivator frame. The action of lifting or lowering the cultivator frame is illustrated by dotted lines in Fig. 3 where it will be seen that the forward end of the frame is lifted by the action of the lever 31 through the rocker arms and connecting rods, and the rear end of the frame is lifted synchronously through the action of the crank arms, the links and the arched levers, thus bodily moving the cultivator frame while maintaining it in horizontal position.

What is claimed is:

The combination with the main frame, the supporting wheels, and a pair of spaced upright posts intermediate of the frame, of a lower cultivator frame, a pair of arched longitudinal levers fulcrumed on said posts and having rear pivoted links connected to the cultivator frame, a rock shaft journaled at the front of the main frame and having a pair of rearwardly extending crank arms and an operating lever, pivoted links between said crank arms and arched levers, forwardly projecting rock arms on the shaft, and flexible connections between the rock arms and front of the cultivator frame.

In testimony whereof I affix my signature.

IRBY B. CASEY.

Copies of this patent may be obtained for five cents each, by addressing the "Commissioner of Patents, Washington, D. C."